Dec. 8, 1931.  P. B. RENFREW ET AL  1,834,969
LIQUID FLOW INDICATOR
Filed Oct. 24, 1927  6 Sheets-Sheet 1
Fig. 1
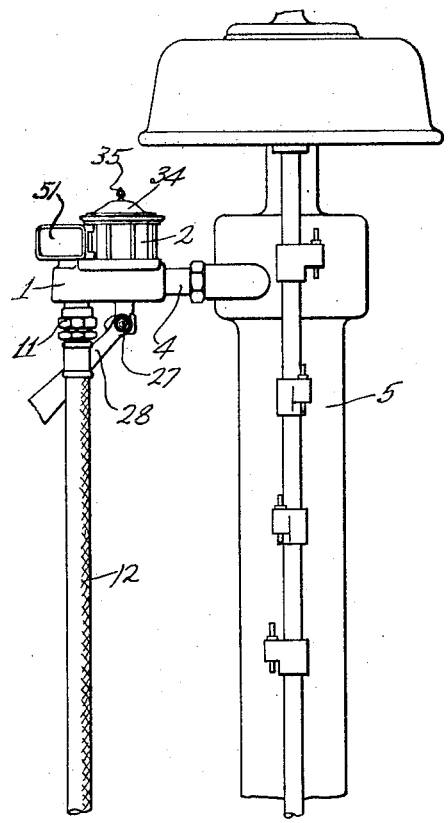
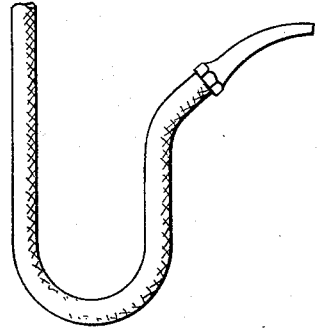
Fig. 2
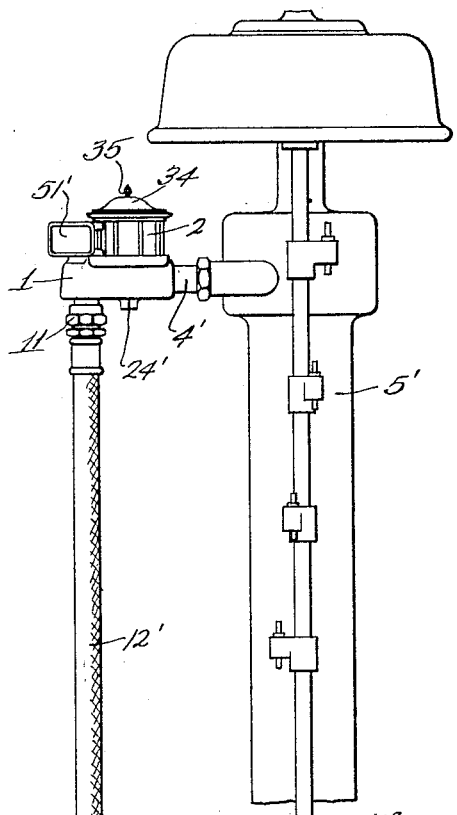
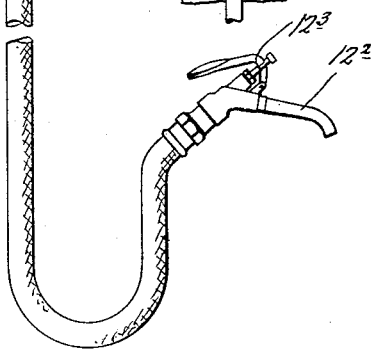
Inventors
Paul B. Renfrew
Thomas C. Fisher
By Nissen & Crane
Attys.

Dec. 8, 1931.  P. B. RENFREW ET AL  1,834,969

LIQUID FLOW INDICATOR

Filed Oct. 24, 1927  6 Sheets-Sheet 6

Inventors
Paul B. Renfrew
Thomas C. Fisher
By Nissen & Crane Attys.

Patented Dec. 8, 1931

1,834,969

UNITED STATES PATENT OFFICE

PAUL B. RENFREW AND THOMAS C. FISHER, OF FORT WAYNE, INDIANA, ASSIGNORS TO S. F. BOWSER & COMPANY, INC., OF FORT WAYNE, INDIANA, A CORPORATION OF INDIANA

LIQUID FLOW INDICATOR

Application filed October 24, 1927. Serial No. 228,144.

Our invention relates in general to liquid dispensers and has particular reference to a liquid flow indicator designed primarily for use in combination with those types of gasoline dispensing pumps commonly employed at automobile service stations and garages.

The principal object of our invention is to provide a liquid dispensing apparatus, such as above described, with improved means which a customer may rely upon as an indication that he is receiving full measure of the liquid being purchased.

Another object of the invention is to provide a visible liquid flow indicating device for accomplishing the above purpose which with only a few changes may be accommodated either to a so-called dry hose dispenser or a wet hose dispenser.

Still another object of the invention is the provision of a liquid flow indicator in which an enclosed discharge valve is visible, in both its open and closed positions, through a transparent part of the indicator.

A still further object of the invention is the provision of a liquid flow indicator in which an enclosed flow indicating member is operable in response to the flow of the liquid to assume an active indicating position visible through a transparent part of the indicator, thus showing to the satisfaction of the customer that the liquid being purchased is flowing through the indicator.

In the accompanying drawings which we have selected for illustrating the application of the invention, the indicating device is shown as applied to a gasoline pump of that general type which is usually employed for dispensing gasoline at service stations. Although the invention is especially adapted for use in combination with gasoline pumps, it is in no sense entirely limited thereto as its construction and mode of operation adapts it to any use where it becomes desirable to indicate the flow of liquid as the same is being transferred from one point to another.

In the drawings—

Figs. 1 and 2 are views in elevation of a portion of a liquid dispensing pump, including the dispensing hose, and illustrating the application of our invention;

Figure 3:
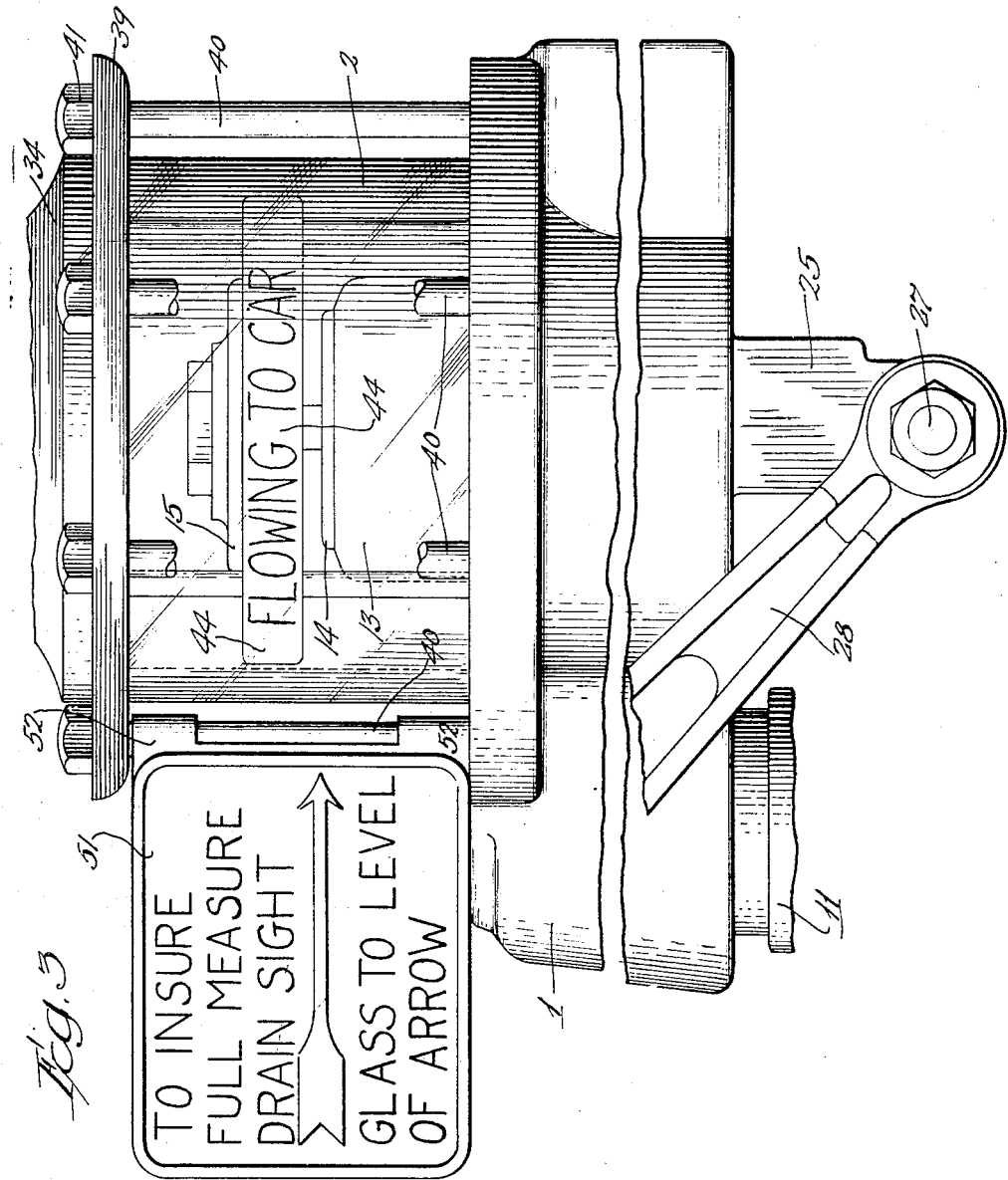
Fig. 3 is a view in side elevation of one form of our liquid flow indicator which is especially adapted for use in combination with a so-called dry hose for liquid dispensing pumps.

Referring first to the form of the device illustrated in Figs. 1, 3, 5 and 7, 1 represents a supporting body for the sight glass 2. The body 1 may usually be made as a casting having a threaded intake 3, preferably in one side thereof, as shown, for connection to the threaded end of the dispensing pipe 4 of a liquid pump 5. The intake 3 into the casing communicates with a semi-circular channel-like compartment 6 which is divided by the partition 7 from the discharge side 8 of the casing in which the outlet 9 is provided. The outlet 9 is preferably arranged in the bottom of the casing and internally threaded for the reception of the threaded end 10 of a coupling 11 for the dispensing hose 12. Formed as an integral part of the partition 7 and as a continuation of the top of the casing is an upstanding cylindrical partition or dam 13, the same being centrally disposed with relation to the channel 6 and having an annular valve seat 14 at the rim thereof for the disc valve 15. The valve 15 is made with a contacting annular surface 16 for the valve seat 14 so as to make a leak-proof fit thereon and is further provided with a stem 17 which slides vertically through the collar guide 18 formed as an integral part of a spider 19 in the cylinder 13. Carried on the lower end of the stem 17 of the valve 15 is a disc 20 which has a reduced diameter 21 providing a ledge on top of the disc for supporting and confining a coil spring 22 around the valve stem between the spider 19 and the disc 20. The valve 15 is thus placed under the influence of this coil spring which imparts a downward pull to the valve, normally retaining the valve firmly seated upon the seat 14. Threaded into an opening 23 in the bottom of the casing is a plug 24 which is preferably cast with a bifurcated bracket mounting 25, between the depending legs of which is mounted a cam 26 which is fixed to a cam pintle 27. Mounted to the cam pintle 27 is a hand-operated lever 28 which may be relied upon to rotate the cam 26 with its camming surface wiping across the rounded face of a button 29 on the push rod 30. The push rod 30 extends through a central bore in the plug 24 and terminates below the disc 20 on the valve stem 17. When the lever 28 is rocked in one direction, the cam 26 will impart a thrust to the push rod 30, which in turn will impart a lift to the valve stem 17 against the resistance of the spring 22 and lift the valve 15 off its seat, which will establish a communication through the cylinder 13 from the sight glass 2 into the discharge side 8 of the casing. To prevent leakage through the bore in the plug 24 which receives the push rod 30, a suitable packing gland 31 may be employed.

The sight glass 2 is supported on the body 1 in an annular recess 32 which is made for the reception of the lower edge of the glass, the same being preferably circular in design, and with a suitable packing 33, such as cork, for the annular recess to make a tight fit around the glass. The top of the sight glass 2 is covered by a cap 34 which may be of any configuration suitable for the purpose, including a screw plug 35 which is threaded into a central opening 36 in the top of the cap 34. This plug 35 may be unscrewed to serve as a release for any air that may become trapped within the sight glass. If not released, any such trapped air would prevent the liquid from readily filling the sight glass when pumped therein so that the device would not function correctly. The fit between the upper edge of the sight glass 2 and the cap 34 may be conveniently made by a recess 37 similar to the recess 32 and with the same guarded against leakage by cork packing 38, as shown. The cap 34 is provided with an annular flange 39 adjacent the recess 37 through which the upper ends of the bolts 40 project. The lower ends of the bolts 40 are secured in the top of the body 1 so that nuts 41 may be used on top of the flange 39 for securely confining the sight glass 2 in the recesses 37 and 32 under compression against the cork washers. Any suitable number of bolts 40 may be employed in spaced relation to one another around the sight glass 2 to effect proper mounting of the sight glass 2 between the body 1 and the cap 34.

Bridging the channel 6 and the cylinder 13 just over the inlet 3, is a connecting web 42 which provides a thickness of metal for supporting a guide rod 43 for the indicating device 44. Two other similar guide rods 45 and 46 are provided for the indicating device on the opposite side of the cylinder 13. These guide rods 45 and 46 are supported in the top of the body 1 within the sight glass 2. The indicating device 44 comprises a circular inverted U-shaped member, preferably produced from sheet metal, and formed to occupy the annular space on the inside of the sight glass 2 around the cylinder 13. The depending side walls of the indicating device have a reasonably close fit with the inside wall of the sight glass 2 and the outer surface of the cylinder 13. This fit, however, should be such as to enable the indicating device to freely slide on the guide rods 43, 45 and 46 in response to the impact of the incoming liquid introduced into the channel 6 below the indicating device. Located immediately under the indicating device is an annular groove or recess 47 which permits the liquid introduced into the channel 6 to flow under the indicating device so that it may directly act upon the same to lift it by impact from its inactive non-indicating position at the bottom of the sight glass into an active flow indicating position at an elevation in the glass. The indicating device 44 is made with sleeved openings 48 to serve as bearings on each of the guide rods.

Figure 5:
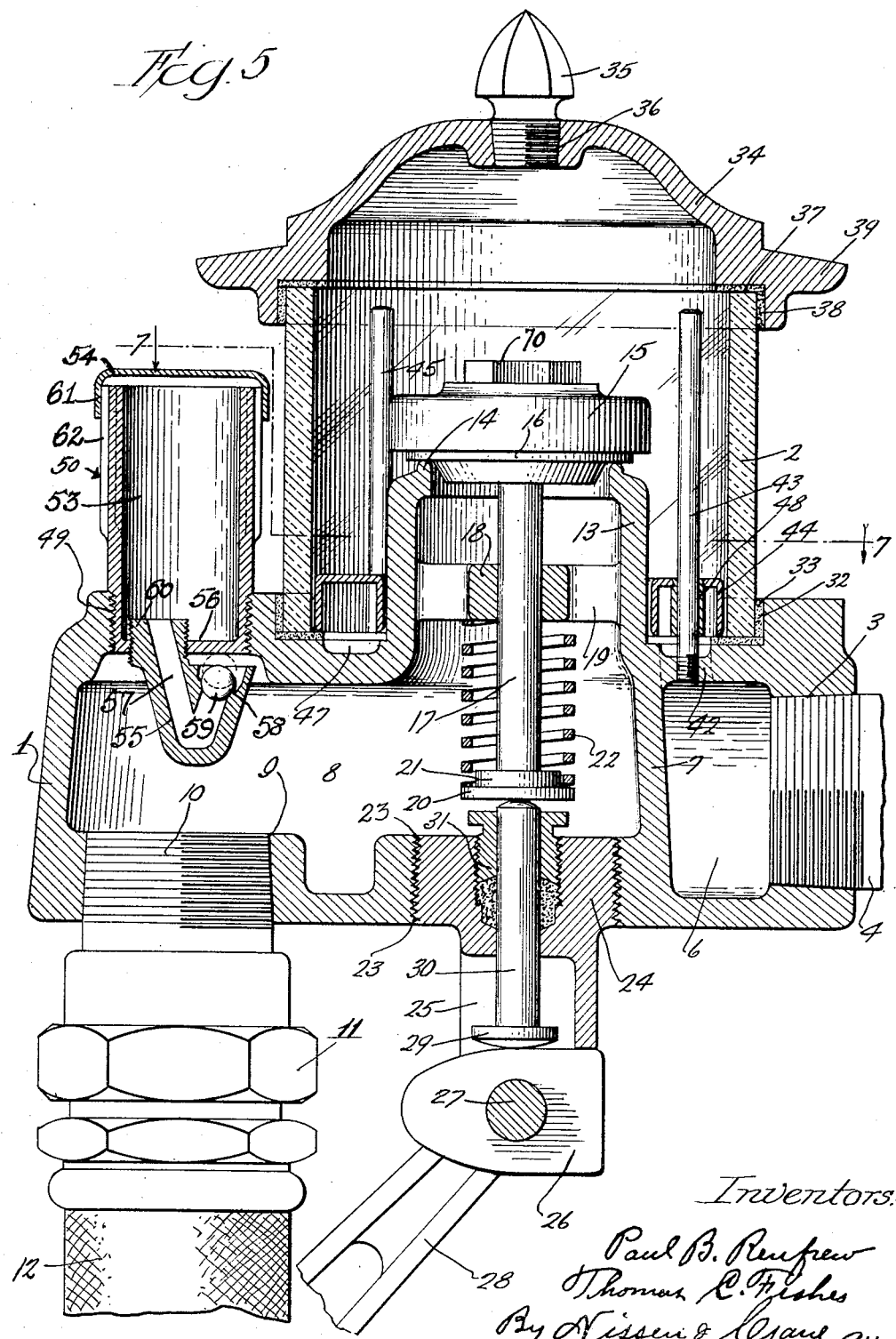
Fig. 5 is a view in vertical section of that form of the device illustrated in Fig. 3.

Arranged in the top of the body 1 is a threaded opening 49 for the reception of a vacuum breaker 50. This vacuum breaker 50, as shown in Fig. 5, permits air to enter the hose 12, breaking the vacuum and allowing the hose to drain immediately. It preferably comprises a cylindrical shell 53 open to atmosphere under the cover 54 and carrying an inverted gooseneck 55 in the bottom 56 thereof. The gooseneck is made with a continuous bore 57 terminating at an upstanding seat 58 for a ball valve 59. The gooseneck may be conveniently attached to the bottom 56 of the shell 53 by threading the enlarged end 60 in an opening therein, as clearly illustrated. The seated position of the ball will seal the bore 57 against discharge of liquid but, in the event a vacuum is made by the outflowing liquid in the chamber 8, the ball 59 will be raised off its seat, automatically breaking the vacuum and allowing the hose 12 to be immediately drained. The cover 54 has a turned down rim flange 61 to fit the ribs 62 so as to space the cover above the open top of the shell 53 and from the sides thereof. In this manner, an opening is left between the cover and shell around the latter so as to provide a relatively large and unobstructed opening for air into the shell and at the same time rely on the cover to exclude débris from the shell.

With the assembly arranged and constructed as described and considering that the device has been applied to a gasoline pump 5, as shown in Fig. 1, delivery through the dry hose 12 may be made by throwing the lever 28 into a position to unseat the valve 15 and with the pump operating, gasoline will flow into the channel 6, moving the flow indicating device 44 by impact into an elevated position on the guide rods 43, 45 and 46, fill the sight glass 2, or, at least occupy a level therein to flow through the valved opening in the cylinder 13, then through the hose 12. During the time that the liquid is flowing through the sight glass 2, the indicating device 44 will be held suspended, by the flow of liquid, in its active flow indicating position, as shown to the bast advantage in Fig. 3.

The indicating device will be provided with the words "Flowing To Car", or, some similar explanation. Until the pump ceases operation and the level of the liquid in the sight glass has receded to a level even with the top of the cylinder 13 so that no more liquid will flow out of the sight glass, the hand lever should be manually held up to keep the valve 15 open. If the operator does not hold the lever up, it will return into its normal position and permit the valve 15 to close before the sight glass has been drained of the liquid purchased by the customer and a short measure will result. The lever 28 and its co-operative connection with the other actuating parts of the valve 15 is purposely made to compel the operator to hold the valve open until the pump has completed the delivery of the full amount of the liquid purchased and such liquid has ffowed through the sight glass. This will require the operator's strict attention to the delivery and prevent him from neglecting the important part of the routine necessary for delivering full measure of the liquid purchased.

If desirable, a placard or sign 51 may be supported alongside the sight glass 2 as an indication to the customer that full measure will be supplied if the sight gauge is drained to the level of the arrow thereon, the level of the arrow being substantially that of the opening into the cylinder 13, this level being reached when the delivery hose is drained of gasoline to the customer. A convenient means of securing the sign adjacent the sight gauge may be made with straps, or the like, 52 for encircling one of the bolts 40.

When flow through the device ceases, the indicator 44, since it is not a float, sinks in the liquid surrounding the cylinder 13 and thus returns to its normal inactive position at the bottom of the sight glass where it is not necessarily exposed to view. The rods which guide the indicator and its movement along the cylinder 13 and the inside of the sight glass prevent it from tilting and binding so that it is readily responsive to the force or impact of the flowing liquid so long as the liquid flows from the pump into the glass cylinder 2. The freedom with which the indicator 44 slides up and down and the small clearance between it and the cylinder 13 on one side and the sight glass on the other side, makes it responsive to a very small upward flow of the liquid from the pump.

A liquid flow indicator constructed as above described will provide a discharge valve which is visible to the customer in both its open and closed positions so that it not only controls the flow of the liquid through the indicator but it also serves in the capacity of an indicating device. So long as the valve 15 is open, the pump operating, and the liquid in the glass cylinder 2 above the cylinder 13, the customer is assured that the liquid is flowing to and through the discharge hose. If the valve is not closed until the level is even with this outlet, it is known that full measure has been dispensed.

The indicating device 44 may be omitted in this particular combination if desired; when omitted, the visible valve may be relied upon as an indicator.

Figure 4:
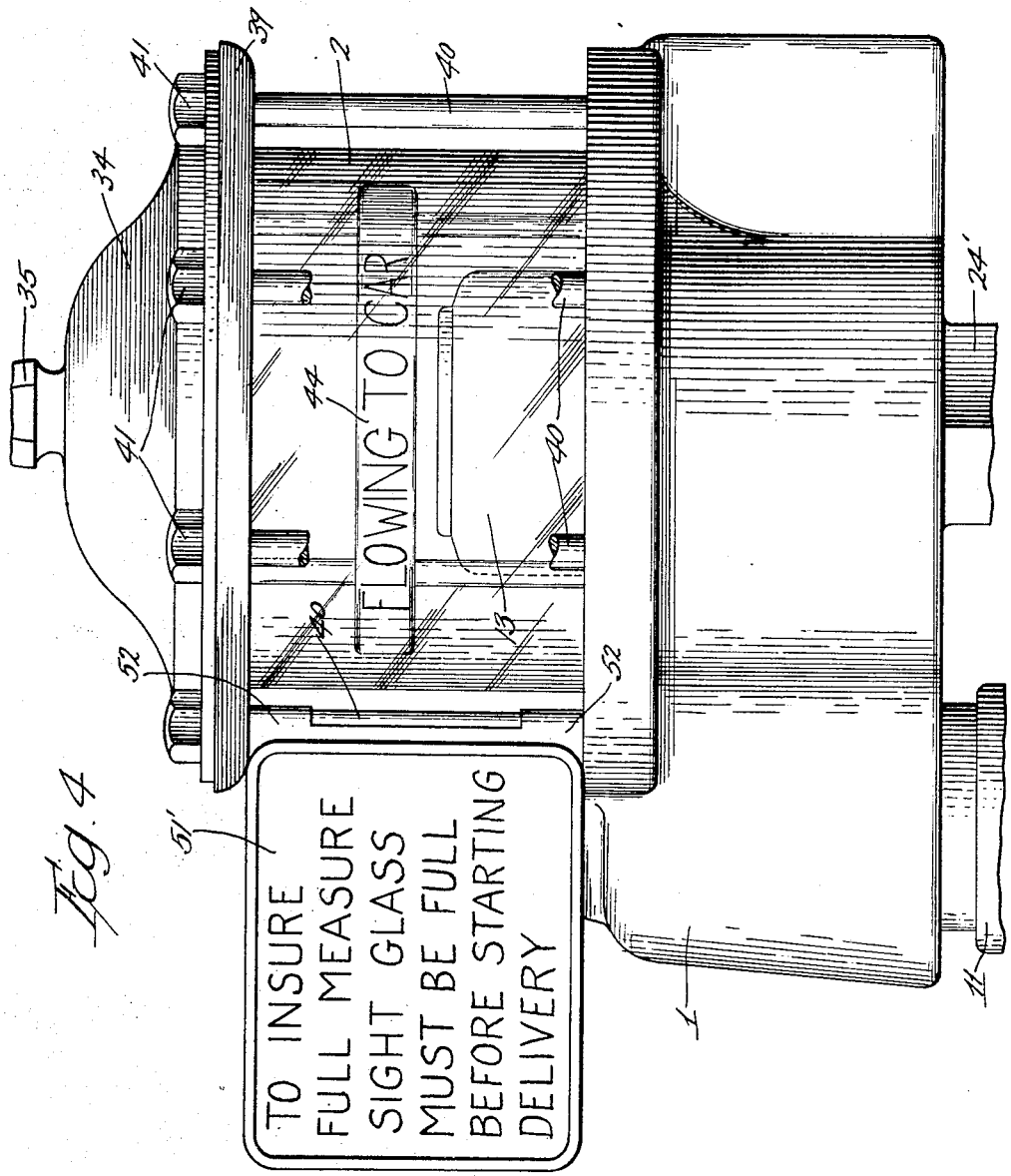
Fig. 4 is a similar view showing a modified form of the device which is especially adapted for use in combination with a so-called wet hose for liquid dispensing pumps.
Figure 6:
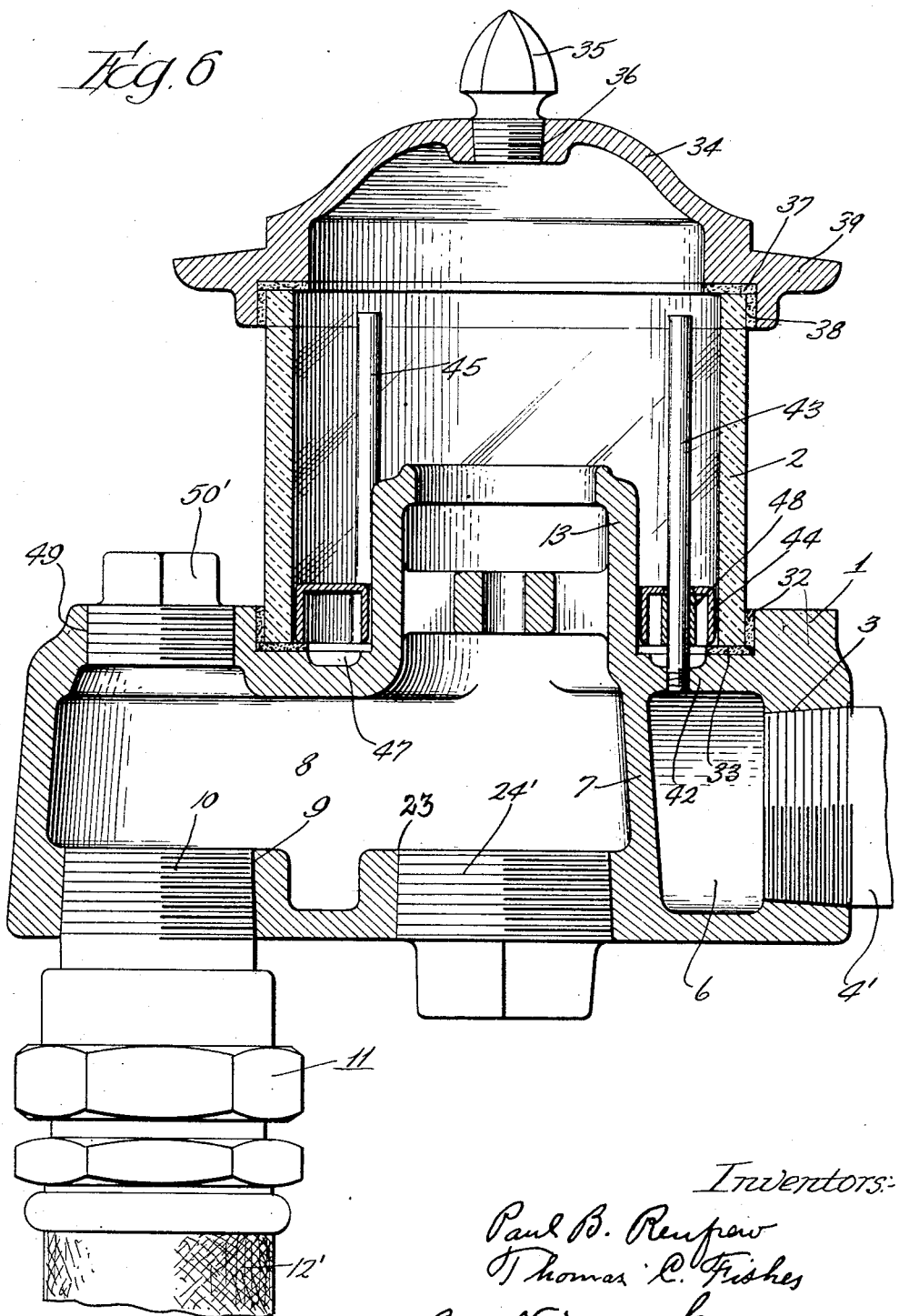
Fig. 6 is a view in vertical section of that form of the device illustrated in Fig. 4.
Figure 7:
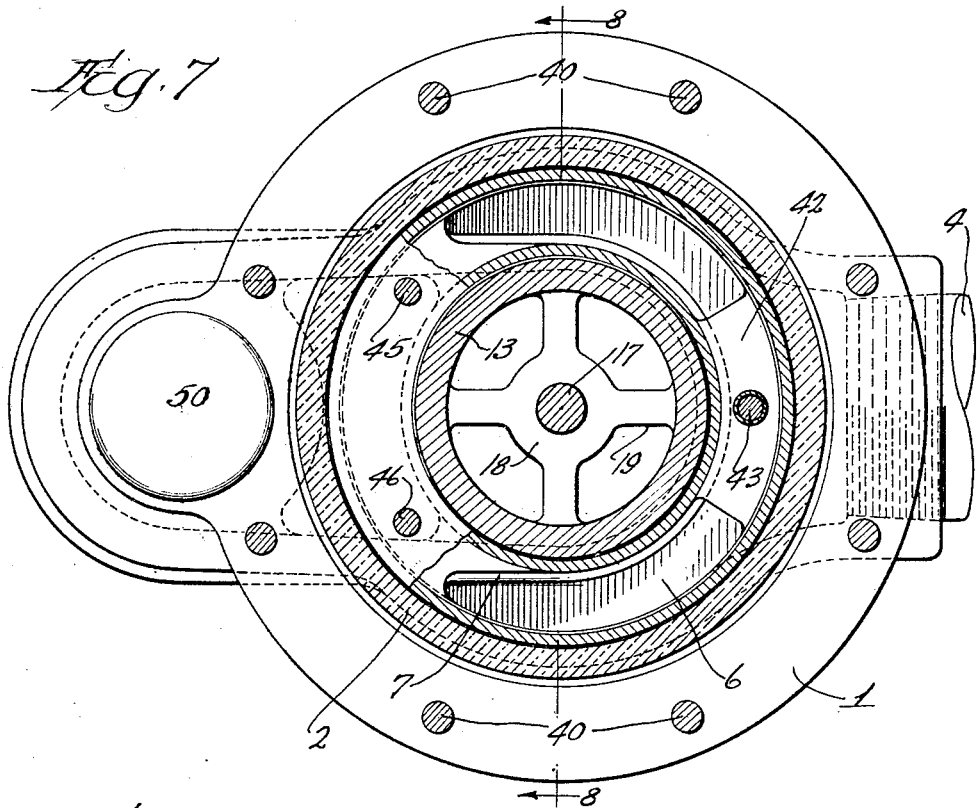
Fig. 7 is a horizontal section taken on the line 7—7 of Fig. 5.

In the embodiment of the invention shown in Figs. 2, 4 and 6, which is intended for a wet hose dispenser, that is to say, a hose having a controlling valve at the nozzle end thereof such as the nozzle $12^2$ and the valve $12^3$, the discharge valve 15 may be omitted. In such a wet hose dispenser, the hose 12' contains liquid after the flow therethrough has been cut off by the valve $12^3$ at the nozzle end. In this method of dispensing, the sight glass must be full before starting delivery and the instructions on the sign bracket 51' will be modified accordingly, as illustrated in Fig. 4. This assures the customer that the discharge hose 12', as well as the sight class chamber, is full of liquid so that immediately upon opening the valve $12^3$, he will obtain delivery of gasoline from the nozzle $12^2$. The indicating device 44 is preferably used in this wet hose assembly and operates in a manner as heretofore explained; that is, it is elevated by impact of flow of the gasoline into active indicating position in accordance with the current flow of the liquid against the underside of the indicator. When the liquid is flowing from the pump through the discharge hose to the tank of the customer's automobile, the indicator 44 will rise to a position where there is visible to him the words on the indicator "Flowing To Car", as shown in Fig. 4. It should be understood that when the lever of the valve $12^3$ is pressed manually, this valve will be opened; when this valve lever is released, the valve closes automatically, the discharge flow from the nozzle $12^2$ will stop, whereupon the indicator 44, being of metal and not being a float, will sink to the bottom of the cylinder 2, as shown in Fig. 6.

In adapting the flow indicator to a wet hose dispenser, the vacuum breaker 50 may be omitted and the opening therefor closed by a plug 50', as shown in Fig. 6. A similar plug 24' may be used to close the opening 23 through which the push rod 30 projects in the form shown in Fig. 5. The indicator may be connected to the pump at the pipe 4' which corresponds to the pipe 4 of the first described form.

Figure 8:
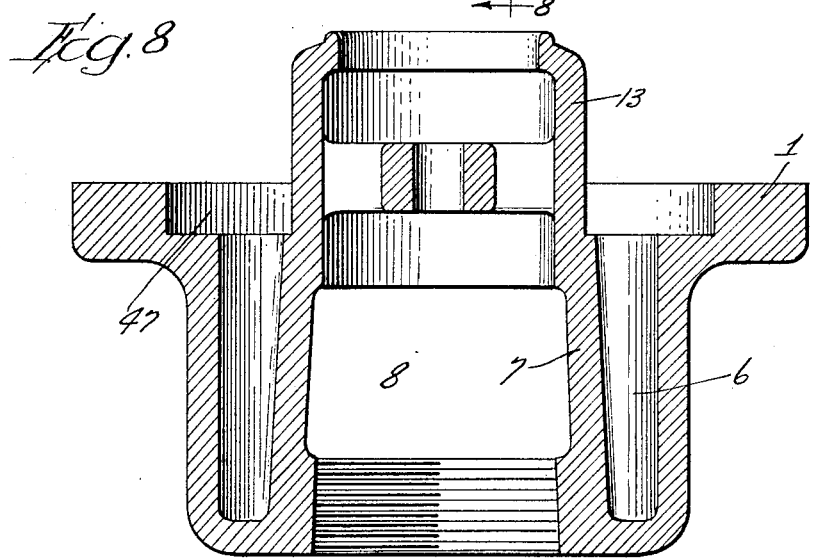
Fig. 8 is a detail view in vertical section of the supporting body for the sight glass, taken on line 8—8 of Fig. 7, but with the valve stem and sight glass removed.

One of the features of the invention resides in the use of one form of casting, referred to as the body 1 and shown in section in Figs. 5, 6 and 8, for embodiment in either a dry hose dispenser or a wet hose dispenser which will make it possible to materially decrease the production costs in supplying any one of the various types of indicators. In other words, the body 1, the cylindrical dam 13 and the sight glass mounted on the body 1 are common to the various forms of indicators which may be supplied to the purchaser and by reason of the various parts shown being detachable from the body 1, assembly into the various forms is greatly facilitated. The cap 34 may be removed by loosening the nuts 41 of Fig. 4, thereby enabling the glass cylinder to be removed for access to the impact ring indicator to remove the latter. If desired, the guide posts 43, 45, 46 may also be removed and screw plugs similar to that at 50' but of smaller size, substituted for the removed guide posts. The delivery hose is detachable at 9 and therefore either a dry hose or a wet hose may be connected to the casting 1.

The flexibility of assembly possible by reason of the particular form of the body 1 will be better understood when the various adaptations are considered. Assuming both the impact ring indicator 44 and the valve 15 omitted, the dry hose 12 should be connected at 9 to the body 1, the plug 24' placed in the opening 23, and the vacuum breaker 50 connected at 49. In such arrangement, when the pump is operated to deliver gasoline into the glass cylinder 2, it will flow directly through the cylindrical dam 13 into the chamber 8 and thence through the hose and the nozzle at the end of the latter, to the customer. When the pumping is discontinued, the gasoline in the hose should be drained and such draining will be complete when the gasoline in the sight glass cylinder 2 drops to the level of the upper edge or seat of the cylindrical dam 13. When such draining from the hose 12 takes place after the pumping operations are discontinued, air is drawn from the atmosphere through the vacuum breaker into the chamber 8, as above explained in the description of the vacuum breaker shown in Fig. 5.

In another assembly, using the same casting 1 with the same glass gauge mounted thereon and with the valve 15 omitted, but including the impact ring 44, the plug 24' is inserted in the opening 23, the plug 50' inserted in the opening 49, and a wet hose 12' attached at 9. As explained above, when the lever of the valve $12^3$ is pressed down against the body of the nozzle, such valve will be opened, whereupon the pump may be operated to fill the glass cylinder 2, the chamber 8 and the hose 12' with gasoline. As soon as the gasoline reaches the nozzle $12^2$ the lever may be released, whereupon the valve will be automatically closed. In starting the operation of this arrangement, some air may be trapped in the cylinder 2, but by removing the plug 35 and temporarily operating the pump, such air may be removed and the plug 35 may be replaced. It should be understood that when this wet hose arrangement is used the glass cylinder is completely filled with gasoline at all times, but when the pump is operated the current flow will lift the impact ring 44 so as to expose to the view of the purchaser the marking shown in Fig. 3, namely, "Flowing to Car". As soon as the valve $12^3$ is opened, the impact ring 44 should be lifted into view in the glass cylinder 2 and as soon as the valve $12^3$ closes, the impact ring will descend back to its lowermost position shown in Fig. 6.

In another arrangement, the valve 15 together with the operating lever 28 and the connections for operating the valve 15 may be included, in which event the vacuum breaker shown in Fig. 5 will also be included and the dry hose 12 connected to the body 1 at 9. This arrangement would be as shown in Fig. 5 with the impact ring 44 omitted. When the pump is operated and the lever 28 held in its upper position manually, the gasoline will flow through the sight glass directly to and through the dry hose 12. When the operation of the pump is discontinued, proper draining of the hose requires holding the valve 15 up until the gasoline in the cylinder 2 drains to the upper level of the cylindrical dam 13. This is indicated on the placard attached as shown in Fig. 3; that is to say, to insure full measure the sight glass should be drained to the level of the arrow and this can be done only by holding the valve 15 open until all of the gasoline, to which the customer is entitled, flows out of the hose 12. However, even after the gasoline in the sight glass drains to the level of the valve seat 14, the vacuum breaker 50 by permitting inflow of air will assure proper draining of the hose 12.

The impact ring 44 may also be used in the arrangement shown in Fig. 5. That is to say, in addition to the valve 15, the impact ring 44 may be used, because when the valve is opened and the pump operated, the upward flow of the gasoline over the annular seat 14 of the cylindrical dam 13 will lift the impact ring and move it into view, as shown in Fig. 3.

It should also be understood that after the apparatus shown in Fig. 5 has been furnished to a purchaser, the latter may change the arrangement, including a dry hose to the arrangement shown in Fig. 6 which includes the wet hose. For this purpose the valve 15 may be removed from the stem 17 by loosening the nut 70, whereupon the valve 15 may be withdrawn from the top of the cylinder 2 after the cap 34 has been removed; and the stem 17 and the spring 22 may be removed through the opening 23 after the part 24 has been unscrewed. The plug 24' will then be inserted in the opening 23, as shown in Fig. 6, and the cap 34 re-assembled on the glass cylinder 2.

It will also be noted that the assembly of the valve operating mechanism shown in Fig. 5 is facilitated by constructing separately the stem 17 and the plunger 30. The operating lever 28 and the plunger 30 may be assembled on the member 34 so that the latter, together with the parts mounted thereon, may be screw-threaded into the opening 23 independently of the valve 15 and the valve stem 17. This arrangement will not prevent the plunger 30 from being blocked in an upper position by placing a block between the cam 26 and the button 29. In the event that the valve 15 is to be held permanently open so that the lever 28 need not be manually operated. Such an arrangement may be desirable in the event that the complete apparatus, as shown in Fig. 5, is furnished a purchaser, including a dry hose, and the purchaser desires to change his structure to a wet hose arrangement. In that event the vacuum breaker 50 would have substituted for it the plug 50' of Fig. 6 and if the valve 15 is blocked to a permanent open position, the impact ring may be relied on to furnish to the customer assurance that he is getting full measure, as indicated in Fig. 3.

Obviously those skilled in the art may make various changes in the details and arrangement of parts without departing from the spirit and scope of the invention as defined by the claims hereto appended and we wish therefore not to be restricted to the precise construction herein disclosed.

Having thus fully disclosed an embodiment of our invention, what we desire to secure by Letters Patent of the United States is:

1. A liquid flow indicator comprising a base structure having openings therein for the reception of fittings for adapting the indicator to different types of liquid dispensing apparatus, an inlet and outlet in said base for accommodating a pump and hose connection respectively, and a visible discharge opening in said indicator comprising an upstanding sleeve on the base structure projecting into a transparent portion of the indicator, said sleeve having means for accommodating a control valve assembly for use in combination with the indicator when the same is used with a dry hose type of dispensing apparatus.

2. In a flow indicator having a transparent portion, the combination of a flow indicating device movable, in response to fluid pressure, from a seat which supports it when inactive into an active suspended flow indicating position within said transparent portion, and a base on which said transparent portion is mounted, said base having an intake side and an outlet side, a liquid communication between the intake side of the base and the bottom of the transparent portion, a sleeve on the base projecting into the transparent portion centrally thereof and around which the flow indicating device is slidably mounted, said sleeve having an opening in the top thereof for establishing a communication between the transparent portion and the outlet side of said base.

3. A liquid flow indicator comprising an upstanding dam surrounded by a channel, a flow indicating device in said channel surrounding said dam and movable along the latter into an active flow indicating position in response to the flow of the liquid through said channel.

4. A liquid flow indicator comprising a casing having a base and a transparent section mounted thereon, an upstanding discharge means projecting from the base into said transparent section, inlet and outlet ports in said base communicating directly with each other through said discharge means in said transparent section, a valve for said discharge means, a spring within said base for closing said valve, means for manually opening said valve from without said casing, and a vacuum breaker for the passageway between said valve and said outlet.

5. A liquid flow indicator comprising a transparent cylinder, a discharge valve within said cylinder, and an indicating device comprising a ring with its outer circumferential surface adjacent the inner walls of said cylinder and movable into an active visible position in response to the flow of liquid through said cylinder.

6. A liquid flow indicator comprising a casing having a transparent section, a single discharge opening in said casing above the bottom thereof in visible position within said transparent section, a control valve for said opening and also in visible position, the single discharge opening and the single valve therefor being located approximately in the center of said transparent section, and means for opening and closing said valve while thus visible through said transparent section, said opening and closing means comprising manually operated mechanism operable from without said casing.

7. A liquid flow indicator comprising a casing through which liquid is flowing, a visible discharge opening in the central portion of said casing above the bottom thereof, a valve for said discharge opening, means for opening and closing said valve comprising a valve stem terminating adjacent a push-rod, and a handle actuated camming device for actuating said push-rod.

8. A liquid flow indicator comprising a casing having a transparent portion, an upstanding discharge cylinder projecting into said transparent portion and having a diameter approximately equal to one-half of the diameter of the transparent portion with the discharge opening approximately in the center of said transparent portion, an inlet and an outlet in said casing directly communicating with one another through said discharge opening, a valve for said discharge opening in position of visibility through said transparent portion, and means on the outside of said casing for manually operating said valve while in such visible position.

9. A liquid flow indicator comprising a casing having a transparent portion, an upstanding discharge projecting into said transparent portion, an inlet and an outlet in said casing directly communicating with one another to said discharge in said transparent portion, a valve for said discharge, means for manually operating said valve from without said casing, and a flow indicating device in the transparent portion of the casing and movable from an inactive position to an active flow indicating position surrounding the peripheral portion of said discharge and adapted to be suspended in such position by the flow of the liquid through said casing.

10. A liquid flow indicator comprising a casing having a transparent section adapted to be located at the upper end of the delivery hose of liquid dispensing apparatus, a single discharge opening within said transparent section in position of visibility, a valve for controlling said discharge opening and also in position of visibility, and means for opening and closing said valve from without said casing.

11. A liquid flow indicator comprising a casing having a transparent section, a discharge port within said transparent section, an inlet and an outlet in said casing with passageways between the same for directing all liquid passing through the casing through said outlet port, and a valve for controlling said outlet port.

12. A liquid flow indicator comprising a casing having inlet and outlet ports, a sight-glass mounted on said casing, a discharge port in visible position within said sight-glass and connected between said inlet and outlet ports to receive all of the liquid flowing through said casing, a valve for said discharge port, means for opening and closing said valve, and a vacuum breaker in the passageway between said inlet and outlet ports.

13. A liquid flow indicator comprising a casing having inlet and outlet ports, a transparent member connected to said casing, a discharge port within said transparent member and visible from without through the latter, and a vacuum breaker in the passageway between said discharge port and said outlet port.

14. A liquid flow indicator comprising a base having inlet and outlet ports, an enclosure comprising a sight-glass mounted on said base, a partition in the base to form separated compartments one in communication with the inlet port and the other in communication with the outlet port, a visible discharge device within said sight-glass and having an upper open end communicating with the chamber leading to the outlet port, and an impact indicator within said sight-glass and surrounding said discharge device in position to be acted on by upward flow from the compartment communicating with the inlet port.

15. A liquid flow indicator comprising an enclosure having a transparent window, a flow indicating device elongated horizontally and transversely within said enclosure with its outer surface visible through said window, means within said enclosure for guiding said flow indicating device when acted upon by impact on its under side of upwardly flowing liquid to lift such device into view through said window, and means for directing the liquid flow upwardly for impact on the under side of said flow indicating device.

16. A liquid flow indicator comprising a casing through which liquid is adapted to flow and which has a transparent section, horizontal elongated indicating device adapted to have thereon wording to advise when liquid is flowing, means within said casing for guiding said indicating device into view through such transparent section when said indicating device is lifted by impact of flow of liquid through said casing, and means for directing the flow of liquid upwardly against the under side of said indicating device to effect lifting impact thereon.

17. A liquid flow indicator comprising a casing having a transparent section, an indicating device in said casing of greater specific gravity than the liquid to be flowed through said casing, said indicating device being responsive to upward flow of the liquid into said casing to move from a non-indicating position to an active-indicating position, said indicating device having an elongated horizontal vertical portion with flow indicating wording thereon adjacent the inner wall of said transparent section and visible therethrough when in active-indicating position, means for guiding vertically said indicating device when moved by upwardly flowing liquid from non-indicating position to active-indicating position, and means for directing liquid flow upwardly against the under side of said indicating device for lifting impact thereon.

18. A base structure for liquid flow indicators adaptable to either a dry hose dispensing system or a wet hose dispensing system, comprising openings for the reception of a valve and operating mechanism therefor for a dry hose dispensing system, a plug for closing one of said openings when said valve and valve operating mechanism are removed for use of the base structure in a wet hose system, inlet and outlet ports to accommodate a pump connection and a hose connection respectively, means affording a seat for a sight-closure, and a visible discharge device adapted to be located within such closure.

19. A base structure for a liquid flow indicator comprising inlet and outlet ports for accommodating a pump connection and a hose connection respectively, means affording a visible discharge opening, and a screw-threaded plug for an opening so related to said discharge opening as to permit valve operating mechanism to be substituted for the plug when a valve is desired to be associated with said discharge opening.

20. A fluid flow indicator comprising a base structure having an inlet port and an outlet port, means affording a discharge port in said base structure between said inlet port and said outlet port, an enclosure for said discharge port comprising a transparent member, detachable means for closing a vent in said enclosure above said discharge port, and detachable means for closing an opening in said base structure below said discharge port and in vertical alinement therewith.

21. A liquid flow indicator comprising a base structure having an inlet port, an outlet port, and a discharge port in the line of flow between the inlet and outlet ports, a sight-device for enclosing the discharge port while rendering the same visible for observation of flow between the inlet and outlet ports, a screw-threaded plug for an opening in the bottom of said base structure in vertical alinement with said discharge port, and another screw-threaded plug for an opening in the upper side of said base structure exteriorly of said enclosure.

In testimony whereof we have signed our names to this specification on this 18 day of October, A. D. 1927.

THOMAS C. FISHER.
PAUL B. RENFREW.